(12) United States Patent
Chapin et al.

(10) Patent No.: US 8,819,955 B2
(45) Date of Patent: Sep. 2, 2014

(54) TAPE MEASURE

(75) Inventors: David Chapin, Raleigh, NC (US);
Daniel M. Stipe, Raleigh, NC (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 187 days.

(21) Appl. No.: 13/415,139

(22) Filed: Mar. 8, 2012

(65) Prior Publication Data

US 2013/0232806 A1 Sep. 12, 2013

(51) Int. Cl.
*G01B 3/10* (2006.01)

(52) U.S. Cl.
USPC .................................. 33/769; 33/761; 33/757

(58) Field of Classification Search
USPC ............ 33/769, 755, 761, 757; 242/170, 376, 242/407
See application file for complete search history.

(56) References Cited

U.S. PATENT DOCUMENTS

| | | | | |
|---|---|---|---|---|
| 1,690,919 A | * | 11/1928 | Baine | 33/427 |
| 1,730,199 A | | 10/1929 | Farrand | |
| 1,988,428 A | | 1/1935 | Carlson | |
| 2,497,471 A | * | 2/1950 | Shillman | 242/397 |
| 3,823,481 A | * | 7/1974 | Chapin | 33/429 |
| 4,067,513 A | * | 1/1978 | Rutty et al. | 242/375.2 |
| 4,077,128 A | | 3/1978 | Stoutenberg | |
| 4,228,589 A | * | 10/1980 | Chemay | 33/759 |
| 4,352,244 A | | 10/1982 | Tomuro | |
| 4,363,171 A | * | 12/1982 | Scandella | 33/769 |
| 4,429,462 A | | 2/1984 | Rutty et al. | |
| 4,487,379 A | | 12/1984 | Drechsler et al. | |
| 5,027,526 A | * | 7/1991 | Crane | 33/763 |
| 5,063,686 A | | 11/1991 | Peloquin | |
| 5,820,057 A | * | 10/1998 | Decarolis et al. | 242/375.3 |
| 6,082,019 A | * | 7/2000 | Lapp et al. | 33/760 |
| 6,367,161 B1 | | 4/2002 | Murray et al. | |
| 6,473,986 B1 | | 11/2002 | Sun | |
| 7,062,862 B2 | | 6/2006 | Wheaton | |
| 7,103,988 B2 | * | 9/2006 | Sanoner | 33/763 |
| 7,107,700 B2 | * | 9/2006 | Lewis et al. | 33/769 |
| 7,159,331 B2 | | 1/2007 | Critelli et al. | |
| 7,357,347 B2 | * | 4/2008 | Lin | 242/385.4 |
| 7,370,432 B2 | | 5/2008 | DuBois | |
| 7,490,414 B2 | | 2/2009 | Critelli et al. | |
| 2002/0129509 A1 | | 9/2002 | Evans, III | |
| 2007/0295847 A1 | * | 12/2007 | Weck et al. | 242/170 |

* cited by examiner

*Primary Examiner* — Christopher Fulton
(74) *Attorney, Agent, or Firm* — Jansson Munger McKinley & Shape Ltd.

(57) ABSTRACT

A measuring tape of the type including a housing enclosing a coil of a resilient rule tape uncoilable to a substantially straight orientation. The housing has first and second sidewalls joined by surrounding walls extending substantially parallel to the coil axis and defining a rule-egress-ingress opening with a rule-tape free end extending therefrom. The inventive measuring tape includes a spool holding the coil of the rule tape wound thereabout and secured to a spool-supporting wall portion of the housing such that the coiled rule-tape coil is entirely removable from the housing. The rule tape has first and second sides and extends for a length which includes a break region spaced from a free end of the uncoiled rule tape. The break region includes a plurality of discrete elongate depressions spaced from one another lengthwise along the rule-tape length.

12 Claims, 4 Drawing Sheets

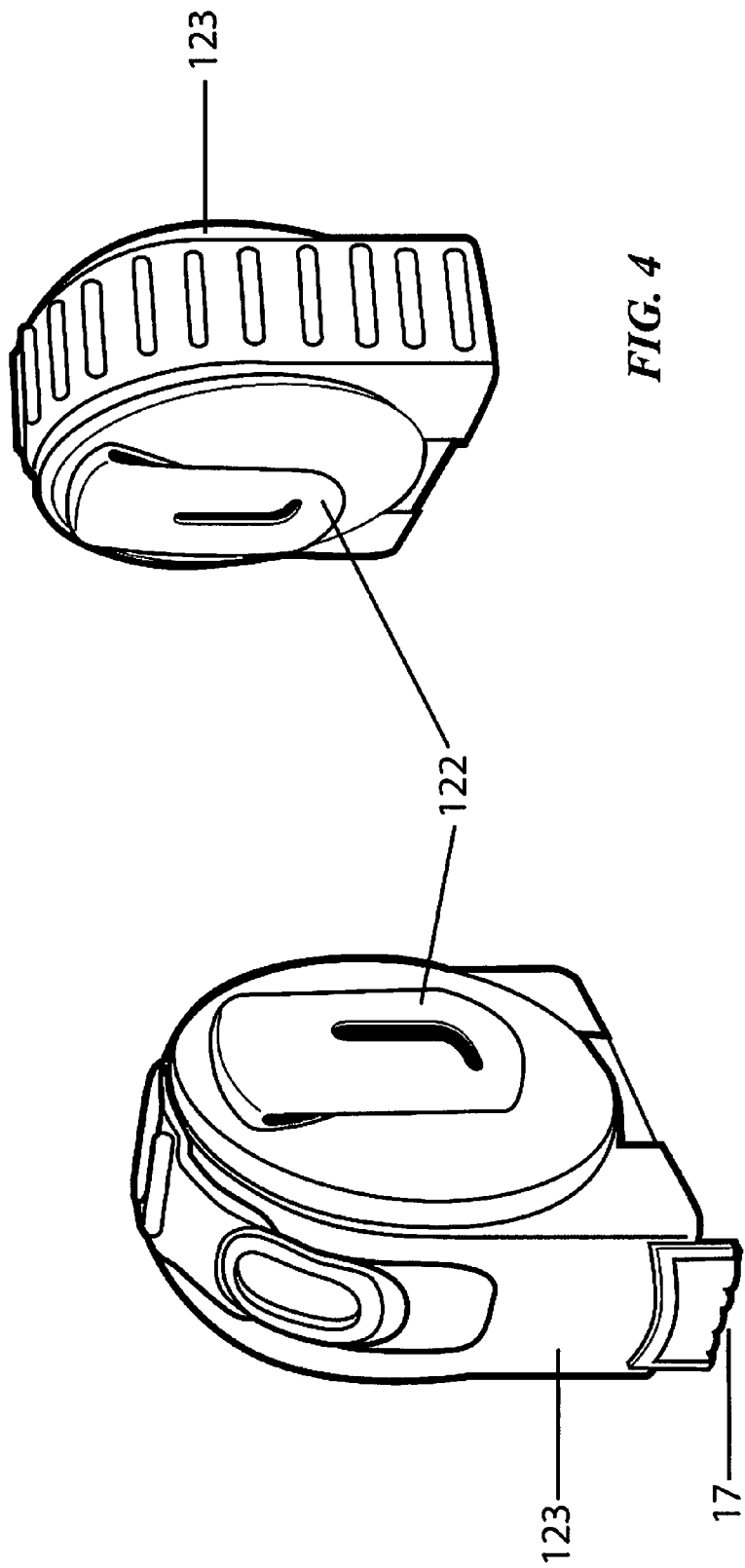

TAPE MEASURE

FIELD OF THE INVENTION

This invention relates to distance-measuring devices, more particularly, to coilable measuring tapes.

BACKGROUND OF THE INVENTION

Coilable measuring tapes are widely used in the construction industry. The measuring tapes are typically made of a resiliently-deformable material, such as spring metal or suitable plastic. Typical life span for coilable measuring tapes is relatively low when compared to other construction tools. This is often due to deformation and breakage of the tape itself. And, while the casing which houses the tape is still in good condition, the whole tool is discarded because of the tape failure. A user has to purchase an entire new tool every time the tape fails. It would be highly beneficial to have a repairable coilable measuring tape with an extended service life.

U.S. Pat. No. 4,077,128 (Stoutenberg) and U.S. Pat. No. 7,370,432 (DuBois) offer coilable measuring tapes that can be entirely removed from the casing. However, structures described in each of these patents allow for removal of the rule tape only by uncoiling the tape with regular retraction through a slot in the casing. In order to place the rule tape inside the casing, the user has to manipulate uncoiled tape by pushing one end through the slot in the casing until successful engagement of the end of the tape with an inner structure of the casing. In both of these structures, the rule tape has to be in uncoiled condition to be either removed or positioned into the casing. Each of these measuring tapes forms a coil only inside the casing. Such manipulations are rather complicated procedures and present substantial inconvenience for the user as well as additional risk of damaging the tape.

Most coilable measuring tapes have an arcuate cross section which gives the tape its rigidity in extended positions. However, at certain lengths the rule-tape basic arcuate configuration can no longer support the horizontal extension and breaks its profile such that the extended end of the rule tape falls down. This prevents completion of intended measurements and causes delays and inconvenience in performing tasks for which the measurements are needed. Therefore, it would be highly beneficial to have a rule tape that can be extended for a substantial length without breaking downward.

OBJECTS OF THE INVENTION

It is an object of the invention to provide an improved measuring tape which overcomes some of the problems and shortcomings of the prior art, including those referred to above.

Another object of this invention is to provide an improved coilable measuring tape which can be easily repaired for an extended service life.

Another object of the invention is to provide an improved coilable measuring tape which is easy to manipulate and service.

Still another object of the invention is to provide an improved coilable measuring tape which extends for a great length without breaking downward.

How these and other objects are accomplished will become apparent from the following descriptions and the drawings.

SUMMARY OF THE INVENTION

This invention, which will be described in detail below, is an improvement in measuring tapes of the type including a housing enclosing a coil of a resilient rule tape uncoilable to a substantially straight orientation. The housing has first and second sidewalls joined by surrounding walls extending substantially parallel to the coil axis and defining a rule-egress-ingress opening. A rule-tape free end extends from the rule-egress-ingress opening.

In most highly preferred embodiments of the present invention, the measuring tape includes a spool holding the coil of the rule tape which is wound about the spool. The spool is preferably secured to a spool-supporting wall portion of the housing such that the coiled rule-tape coil is entirely removable from the housing. It is preferred that the spool-supporting wall portion is separable from the remainder of the housing. The housing and the spool-supporting wall may be held together by fasteners such as screws or the like.

The spool-supporting wall portion is preferably a base wall including an edge bordering the rule-egress-ingress opening. The rule-tape free end preferably extends through the rule-egress-ingress opening between the base wall and an adjacent portion of the surrounding wall which is preferably a part of the remainder of the housing. Such preferred embodiments preferably include a spool-holding member extending from the base wall and rotationally supporting the spool thereabout. The spool-holding member is preferably a portion of the first sidewall and is separable therefrom upon removal of the coiled rule-tape coil from the housing.

In another aspect of the present invention, the rule tape has first and second sides and extends for a length which includes a break region spaced from the free end of the uncoiled rule tape. In preferred embodiments of the inventive measuring tape, the break region includes a plurality of discrete elongate depressions spaced from one another lengthwise along the rule-tape length. The plurality of depressions preferably includes depressions spaced from one another widthwise on the rule tape. In some embodiments, each depression has a length which is less than the rule-tape width.

The depressions are preferably arranged in staggered rows along the break region. It is preferred that the depressions in each row are spaced lengthwise by a distance smaller than lengths of depressions in the adjacent row(s).

In some of such embodiments, the elongate depressions may be angled with respect to the length of the rule tape.

BRIEF DESCRIPTION OF THE DRAWINGS

FIG. 3 is a front perspective view of the measuring tape of FIG. 1 with the rule tape fully coiled inside the housing.

FIG. 4 a rear perspective view of the measuring tape of FIG. 3.

DETAILED DESCRIPTION OF PREFERRED EMBODIMENTS

Figure 1:
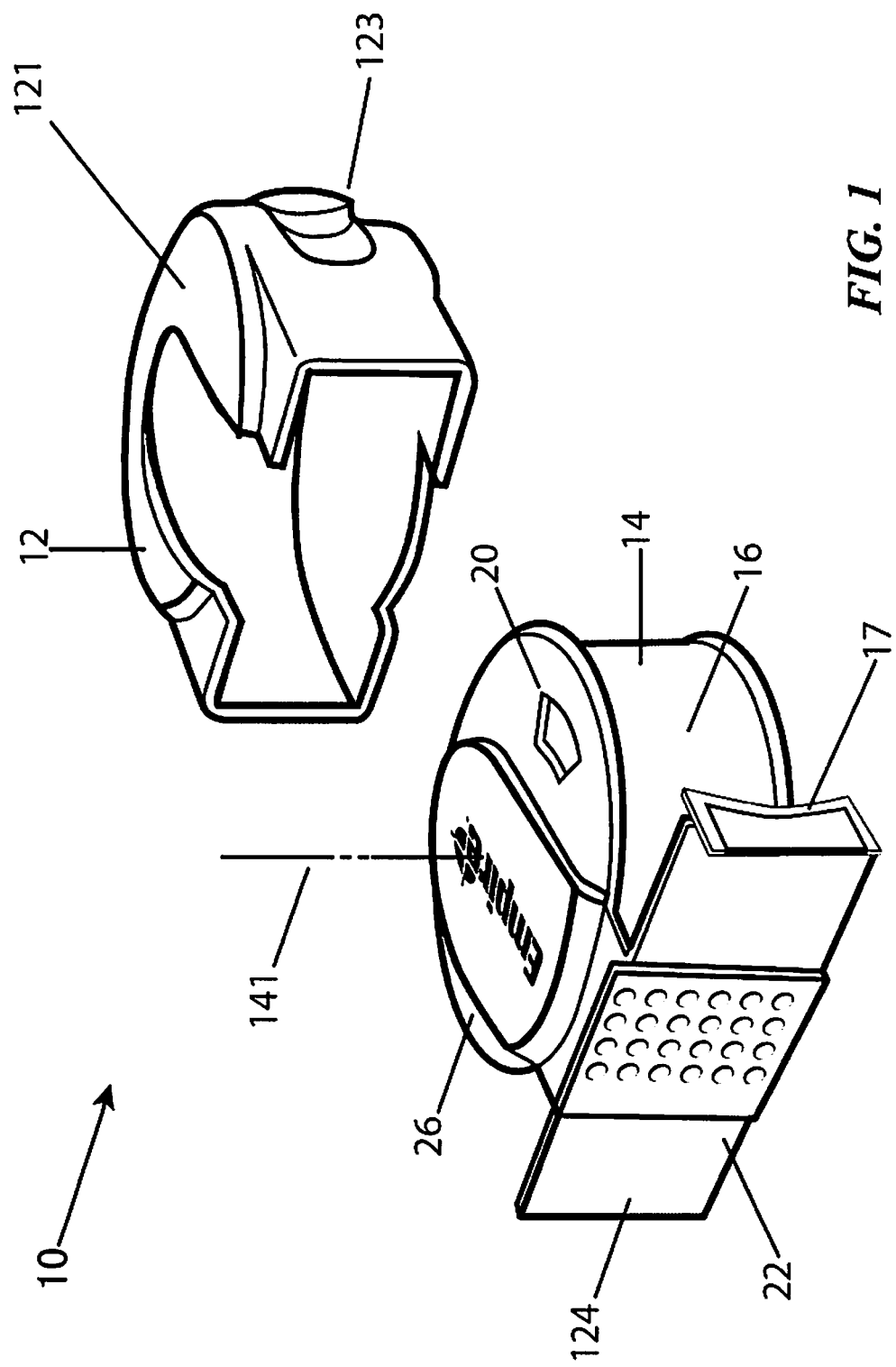
FIG. 1 is an exploded view of a measuring tape in accordance with this invention.

The drawings show a measuring tape 10 that includes a housing 12 enclosing a coil 14 of a resilient rule tape 16 uncoilable to a substantially straight orientation.

FIGS. 1-4 show that housing 12 has first and second sidewalls 121 and 122 joined by surrounding walls 123 extending substantially parallel to the coil axis 141 and defining a rule-egress-ingress opening 18. A rule-tape free end 17 extends from rule-egress-ingress opening 18.

As best seen in FIG. 1, measuring tape 10 includes a spool 20 holding coil 14 of rule tape 16 which is wound about spool 20. Spool 20 is secured to a spool-supporting wall portion 22 of housing 12 such that coiled rule-tape coil 14 is entirely removable from housing 12. It is further seen in FIG. 1 that spool-supporting wall portion 22 is separable from the remainder of housing 12.

Typical prior measuring tapes are in general disposable tools. The life span of measuring tapes is relatively short. This is most often due to the breakage of the tape itself. Therefore, once the tape breaks, the user throws away the entire tool and purchases a new one. The present invention provides a repairable measuring tape. The removable spool of coiled rule-tape permits for easy repair of the tool by a simple replacement of the rule-tape. Such easy repair eliminates the need for complete replacement of the tool and provides an economical solution to the rule-tape breakage.

Figure 2:
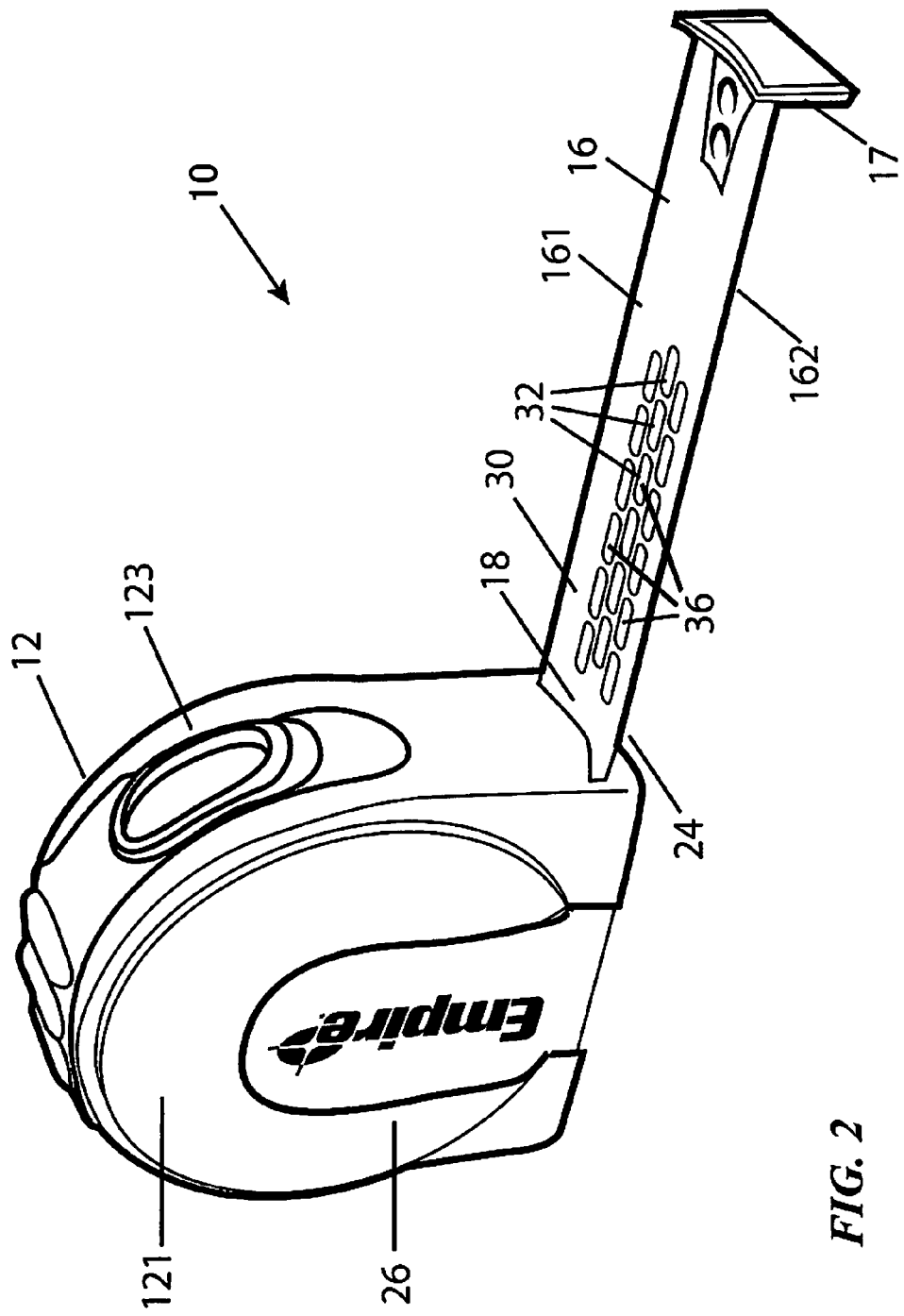
FIG. 2 is a perspective view of the measuring tape of FIG. 1 with a rule tape extended from a rule-egress-ingress opening and showing a break region with elongate depressions.

FIG. 2 best shows that spool-supporting wall portion 22 is a base wall 124 including an edge 24 bordering rule-egress-ingress opening 18. Rule-tape free end 17 extends through rule-egress-ingress opening 18 between base wall 124 and an adjacent portion of surrounding wall 123 which is a part of the remainder of housing 12.

As shown in FIGS. 1 and 2, a spool-holding member 26 extends from base wall 124 and rotationally supports spool 20 thereabout. As seen in FIG. 2, spool-holding member 26 is a portion of the first sidewall 121 and is separable therefrom upon removal of coiled rule-tape coil 14 from housing 12.

FIGS. 2 and 5-7 show another aspect of the present invention. In particular, it is seen in FIG. 2 that rule tape 16 has first and second sides 161 and 162 and extends for a length which includes a break region 30 spaced from free end 17 of uncoiled rule tape 16. As best seen FIGS. 5-7, break region 30 includes a plurality of discrete elongate depressions 32 spaced from one another lengthwise along rule-tape length 19. Plurality of depressions 32 includes depressions spaced from one another widthwise on rule tape 16. In embodiments shown in FIGS. 2 and 7, each depression 32 has a length 34 which is less than rule-tape width 21.

Depressions 32 are arranged in staggered rows 36 along break region 30, as shown in FIG. 2. Depressions 32 in each row 36 are spaced lengthwise by a distance smaller than lengths 34 of depressions in the adjacent row(s).

Figure 5:
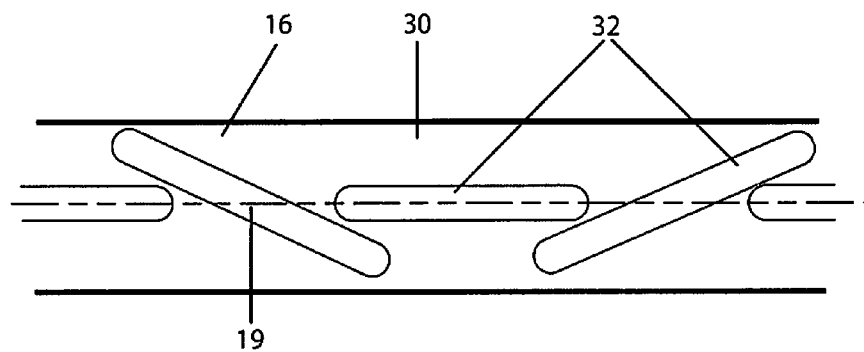
FIG. 5 is a fragmentary view of the break region showing one example of the elongate depressions.
Figure 6:
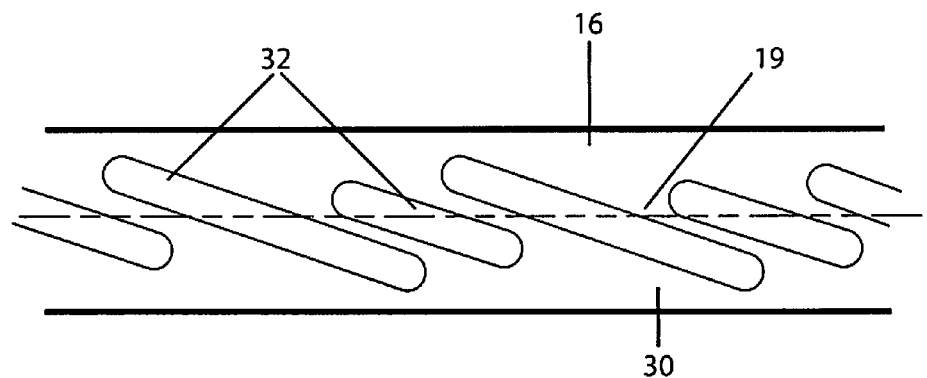
FIG. 6 is a fragmentary view of the break region showing another example of the elongate depressions.
Figure 7:
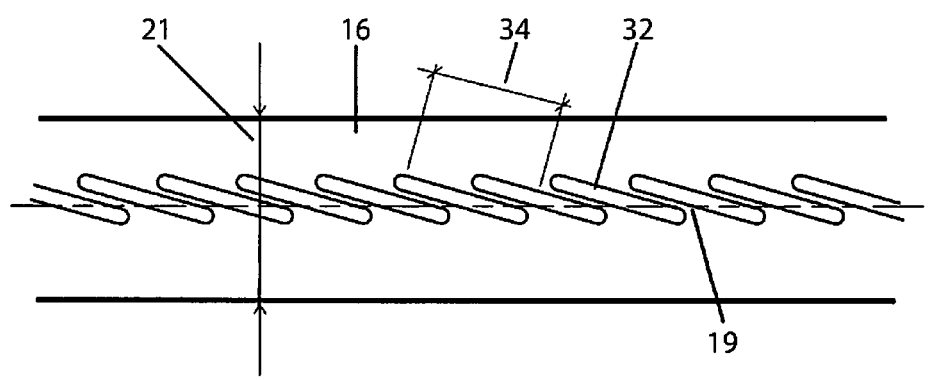
FIG. 7 is a fragmentary view of the break region showing yet another example of the elongate depressions.

FIGS. 5-7 show elongate depressions 32 angled with respect to length 19 of rule tape 16.

In typical coilable rule-tapes, the break region is at about six and a half to seven feet from the free end of the rule tape. That means that once the free end of the typical prior rule tape extended to such distance, the tape folds and falls to the ground. The presence of the inventive depressions in the break region provides much needed reinforcement such that the break region is extended to about nine to ten feet. This provides a greater measuring distance and better flexibility in the use of the inventive measuring tape.

The invention claimed is:

1. In a measuring tape of the type including a housing enclosing a coil of a resilient rule tape uncoilable to a substantially straight orientation and connected to a spring secured to a coil axle for a spring-powered retraction into the housing, the housing having first and second sidewalls joined by surrounding walls extending substantially parallel to the coil axis and defining a rule-egress-ingress opening with a rule-tape free end extending therefrom, the improvement comprising a spool including the coil axle secured to a spool-supporting wall portion which is separable from the remainder of the housing, the spool holding the rule-tape coil and the spring wound about the axle and being entirely removable from the housing with the coiled rule-tape coil thereon.

2. The measuring tape of claim 1 wherein the spool-supporting wall portion is a base wall including an edge bordering the rule-egress-ingress opening.

3. The measuring tape of claim 2 wherein the rule-tape free end extends through the rule-egress-ingress opening between the base wall and an adjacent portion of the surrounding wall which is part of the remainder of the housing.

4. The measuring tape of claim 3 further including a spool-holding member extending from the base wall and rotationally supporting the spool thereabout.

5. The measuring tape of claim 4 wherein the spool-holding member is a portion of the first sidewall and is separable therefrom upon removal of the coiled rule-tape coil from the housing.

6. The measuring tape of claim 1 wherein the rule tape has first and second sides and extends for a length which includes a break region spaced from a free end of the uncoiled rule tape, the break region including a plurality of discrete elongate depressions spaced from one another lengthwise along the rule-tape length.

7. The measuring tape of claim 6 wherein the elongate depressions are angled with respect to the length of the rule tape.

8. The measuring tape of claim 6 wherein the plurality of depressions includes depressions spaced from one another widthwise on the rule tape.

9. The measuring tape of claim 8 wherein the plurality of depressions includes depressions spaced from one another lengthwise on the rule tape.

10. The measuring tape of claim 6 wherein each depression has a length less than the rule-tape width.

11. The measuring tape of claim 6 wherein the depressions are arranged in staggered rows along the break region.

12. The measuring tape of claim 11 wherein the depressions in each row are spaced lengthwise by a distance smaller than lengths of depressions in the adjacent row(s).

* * * * *